A. W. SPRAGUE & T. E. MULROYAN.
GATE.
APPLICATION FILED OCT. 19, 1908.
933,594.
Patented Sept. 7, 1909.
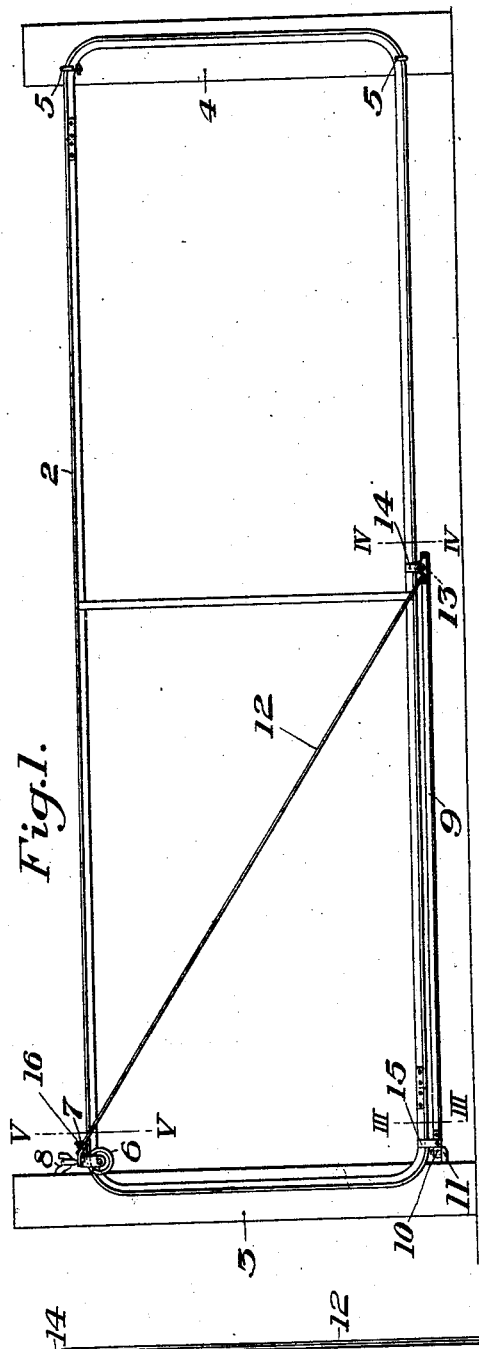
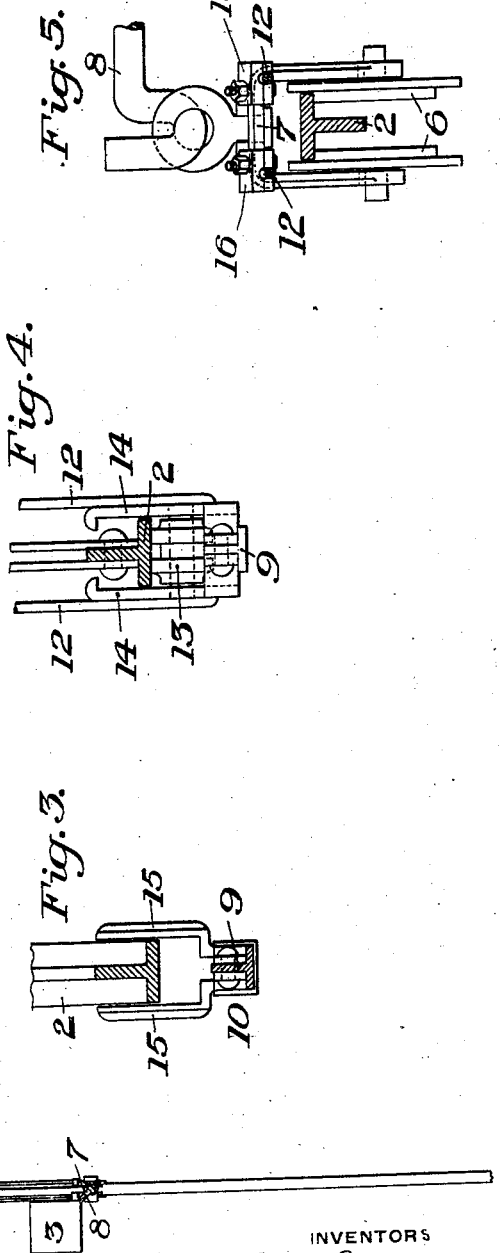
WITNESSES
R H Balderson
G L Winters
INVENTORS
A. W. Sprague
T. E. Mulroyan,
by Bakewell, Byrnes & Parmelee,
their Attys.

UNITED STATES PATENT OFFICE.

ARTHUR W. SPRAGUE, OF LA GRANGE, AND THOMAS E. MULROYAN, OF DE KALB, ILLINOIS, ASSIGNORS TO AMERICAN STEEL & WIRE COMPANY, OF CHICAGO, ILLINOIS, A CORPORATION OF NEW JERSEY.

GATE.

933,594.  Specification of Letters Patent.  Patented Sept. 7, 1909.

Application filed October 19, 1908. Serial No. 458,401.

*To all whom it may concern:*

Be it known that we, ARTHUR W. SPRAGUE, of La Grange, Cook county, Illinois, and THOMAS E. MULROYAN, of De Kalb, Dekalb county, Illinois, have invented a new and useful Improvement in Gates, of which the following is a full, clear, and exact description, reference being had to the accompanying drawings, forming part of this specification, in which—

Figure 1 is a side elevation of one form of gate embodying our invention; Fig. 2 is a top plan view showing the gate in an open position; and Figs. 3, 4 and 5 are detail sectional views taken respectively on the lines III—III, IV—IV and V—V of Fig. 1.

Our invention has relation to gates of the combined sliding and swinging type, and is designed to provide a supporting means of novel, simple and effective character, for carrying the weight of the gate in all positions thereof, thereby enabling the gate to be opened and closed with very little effort, and also preventing it from sagging on its hinges.

The nature of our invention will be best understood by reference to the accompanying drawings, in which we show one form thereof, and which will now be described, it being premised, however, that various changes may be made in the details of construction and arrangement without departing from the spirit and scope of our invention as defined in the appended claims.

In these drawings, the numeral 2 designates the gate frame, which in the present instance is shown as composed of flanged metal bars, preferably of T-shape in cross section. 3 designates the hinge post for the gate, and 4 the post at the opposite end against which the gate closes, and which is provided with any suitable latch means 5. The gate frame 2 is supported from the post 3 by means of the wheels or rollers 6 hung in the swiveled yoke 7 supported by a hook 8 driven into the post, the swivel connection and its engagement with the hook being clearly shown in Fig. 5.

9 designates a supporting bar, which is placed below the gate frame and immediately beneath the lower bar of said frame. This bar 9 is provided at one end with a hinge eye 10 which engages the hinge pin or hook 11 secured in the post 3, and its opposite end is supported from the yoke 7 by oblique, adjustable brace rods 12 which are clamped to the yoke by means of the screw clamps 16. This bar preferably extends somewhat more than one-half the length of the gate, and has journaled at its outer end portion an anti-friction roller 13, upon which the lower bar of the frame 2 rests and travels. Said bar 9 is also provided with the upwardly extending guide arms 14, which loosely embrace opposite sides of the lower frame bar. The opposite end of the bar 9 is also preferably provided with the guide arms 15, which embrace the lower frame bar and which serve to hold the gate properly in line. The gate when unlatched can be swung open, or it can be moved endwise for a portion of its length and then swung open in the manner customary with this type of gate. The hinged or swiveled supporting arm 9 takes practically the entire weight of the gate in all positions, so that its movement requires but little effort. By placing this bar 9 below the gate frame in the vertical plane thereof, it is entirely out of the way of any covering which it may be desired to use on the gate frame. Thus, the gate frame may be covered with wire netting, or any other suitable material, without interference with this bar.

The flanged shape of the metal bars used in the construction of the gate frame provides a strong and durable construction, and also facilitates the guiding and movement of the gate, since the bottom flange forms a broad bearing for the roller 13, and also provides means for the engagement of the guide arms. The adjustable brace rods provide simply a means whereby the outer end of the gate can be raised or lowered to meet the various requirements and conditions to give the proper hang in all cases. We do not, however, limit ourselves to undertake the construction of the gate frame, since this may be made in any suitable manner. Other details of the construction and arrangement can also obviously be changed without departing from the spirit and scope of our invention.

What we claim is:—

1. In a combined sliding and swinging gate, an endwise movable gate frame, a roller frame swiveled to the hinge post, a roller mounted therein and forming a support for the upper bar of said frame, a supporting bar also swiveled to the hinge post and extending below the lower bar of the gate frame and an adjustable brace rod connected to the supporting bar and the roller frame; substantially as described.

2. In a combined sliding and swinging gate, the combination of a gate frame, a supporting roller mounted in a frame swiveled to the hinge post and engaging the upper bar of said frame, a supporting bar also swiveled to the hinge post and extending underneath the lower bar of the gate frame, and a brace rod connecting said supporting bar with the roller frame; substantially as described.

3. In a combined sliding and swinging gate, a gate frame, a swiveled support attached to the hinge post and engaging the upper bar of said frame, and a supporting arm also swiveled to the hinge post and extending underneath the lower bar of said frame, the free end of said bar having a supporting connection with the roller frame, and the bar having guiding and supporting means engaging said lower frame bar; substantially as described.

4. In a combined sliding and swinging gate, a gate frame, a supporting roller mounted in a frame swiveled to the hinge post and engaging the upper bar of said frame, and a supporting bar also swiveled to the hinge post and extending below the gate and underneath the lower bar of the gate frame, said bar having a supporting connection between its outer end portion and the roller frame, and also carrying an anti-friction supporting roller for the lower frame bar; substantially as described.

5. In a combined sliding and swinging gate, the combination of a gate frame, a supporting roller mounted in a frame swiveled to the hinge post and engaging the upper bar of said frame, a supporting bar also swiveled to the hinge post and extending underneath the lower bar of the gate frame, and an adjustable brace rod connecting said supporting bar with the roller frame; substantially as described.

6. In a combined sliding and swinging gate, the combination of a gate frame, a supporting roller mounted in a frame swiveled to the hinge post and engaging the upper bar of said frame, a supporting bar also swiveled to the hinge post and extending underneath the lower bar of the gate frame, and adjustable brace rods connecting said supporting bar with the roller frame; substantially as described.

7. In a combined sliding and swinging gate, an endwise movable gate frame, a supporting bar pivoted to the hinge post and extending below the lower bar of the gate frame, the supporting bar having a centrally located upwardly projecting rib, and clips secured to said rib at both ends of the supporting bar to form guides for the lower bar of the gate frame, substantially as described.

8. In a combined sliding and swinging gate, an endwise movable gate frame, a roller frame swiveled to the gate post, a roller mounted therein and supporting the upper bar of the gate frame, a supporting bar hinged to the gate post and extending below the gate frame, and brace rods connecting the outer end of the supporting bar with the roller frame; substantially as described.

9. In a combined sliding and swinging gate, an endwise movable gate frame, a roller frame swiveled to the gate post, flanged rollers mounted therein supporting and guiding the upper bar of the gate frame, a supporting bar hinged to the gate post and extending below the gate frame, and brace rods connecting the outer end of the supporting bar with the frame of the rollers; substantially as described.

10. In a combined sliding and swinging gate, an endwise movable gate frame, a roller frame swiveled to the gate post, flanged rollers mounted therein supporting and guiding the upper bar of the gate frame, a supporting bar hinged to the gate post and extending below the gate frame, upwardly projecting clips at each end of the supporting bar engaging the lower bar of the gate frame, and brace rods connecting the outer end of the supporting bar with the frame of the rollers; substantially as described.

11. In a combined sliding and swinging gate, an endwise movable gate frame, a roller frame swiveled to the gate post, flanged rollers mounted therein supporting and guiding the upper bar of the gate frame, a supporting bar hinged to the gate post and extending below the gate frame, clips secured to the ends of the supporting bar and guiding the lower bar of the gate frame, and rollers journaled in the clips on the outer end of the supporting bar for supporting the lower bar of the gate frame; substantially as described.

In testimony whereof, we have hereunto set our hands.

ARTHUR W. SPRAGUE.
THOMAS E. MULROYAN.

Witnesses as to Arthur W. Sprague:
J. W. MEAKINS,
H. A. PARKS.

Witnesses as to Thomas E. Mulroyan:
W. A. KILMER,
T. D. TEMPLE.